(12) United States Patent
Koyanagi et al.

(10) Patent No.: US 10,862,341 B2
(45) Date of Patent: Dec. 8, 2020

(54) ELECTRIC POWER TRANSMISSION DEVICE

(71) Applicant: PANASONIC CORPORATION, Osaka (JP)

(72) Inventors: Yoshio Koyanagi, Kanagawa (JP); Kazuhiro Eguchi, Fukuoka (JP); Souichi Kawata, Fukuoka (JP); Futoshi Deguchi, Fukuoka (JP); Katsuya Okamoto, Fukuoka (JP); Ryosuke Hasaba, Kanagawa (JP); Tamaki Ura, Nagasaki (JP)

(73) Assignee: PANASONIC CORPORATION, Osaka (JP)

(*) Notice: Subject to any disclaimer, the term of this patent is extended or adjusted under 35 U.S.C. 154(b) by 43 days.

(21) Appl. No.: 16/344,703

(22) PCT Filed: Sep. 5, 2017

(86) PCT No.: PCT/JP2017/031865
§ 371 (c)(1),
(2) Date: Apr. 24, 2019

(87) PCT Pub. No.: WO2018/079082
PCT Pub. Date: May 3, 2018

(65) Prior Publication Data
US 2019/0334380 A1    Oct. 31, 2019

(30) Foreign Application Priority Data
Oct. 28, 2016  (JP) .................................. 2016-212218

(51) Int. Cl.
*H02J 50/12*        (2016.01)
*H02J 50/80*        (2016.01)
(Continued)

(52) U.S. Cl.
CPC .............. *H02J 50/12* (2016.02); *B60L 53/12* (2019.02); *B63G 8/00* (2013.01); *H02J 50/50* (2016.02);
(Continued)

(58) Field of Classification Search
CPC .. H02J 50/12; H02J 50/80; H02J 50/50; H02J 7/025; B60L 53/12; B60L 2200/32; B60G 8/00
See application file for complete search history.

(56) References Cited

U.S. PATENT DOCUMENTS

| | | |
|---|---|---|
| 2005/0057422 A1 | 3/2005 | Deguchi et al. |
| 2014/0232200 A1 | 8/2014 | Maekawa |

(Continued)

FOREIGN PATENT DOCUMENTS

| | | |
|---|---|---|
| JP | 05-120925 | 5/1993 |
| JP | 07-189290 | 7/1995 |

(Continued)

OTHER PUBLICATIONS

Hasaba et al., "Study of wireless power transmission for under seawater using EM simulation", Proceedings of the 2016 IEICE General Conference Tsushin, Mar. 16, 2016, pp. 681.

(Continued)

*Primary Examiner* — Robert L Deberadinis
(74) *Attorney, Agent, or Firm* — Greenblum & Bernstein, P.L.C.

(57) ABSTRACT

An electric power transmission device capable of efficiently performing contactless electric power transmission to an underwater vehicle in water is provided. The electric power transmission device, which is an electric power transmission device transmitting electric power to an electric power reception device including an electric power reception coil in water, includes one or more transmission coils including (Continued)

an electric power transmission coil which transmits electric power to an electric power reception coil via a magnetic field, an electric power transmission unit which transmits AC power to an electric power transmission coil, a capacitor which is connected to the transmission coil and forms a resonant circuit which resonates with the transmission coil, and a buoyant body connected to at least one of the transmission coils.

14 Claims, 10 Drawing Sheets

(51) Int. Cl.
    *H02J 50/50* (2016.01)
    *B60L 53/12* (2019.01)
    *B63G 8/00* (2006.01)
    *H02J 7/02* (2016.01)

(52) U.S. Cl.
    CPC .......... *H02J 50/80* (2016.02); *B60L 2200/32* (2013.01); *H02J 7/025* (2013.01)

(56) References Cited

U.S. PATENT DOCUMENTS

| | | | |
|---|---|---|---|
| 2015/0015087 | A1 | 1/2015 | Endo et al. |
| 2015/0311880 | A1 | 10/2015 | Yoshida et al. |
| 2016/0013664 | A1 | 1/2016 | Maekawa et al. |
| 2016/0049799 | A1 | 2/2016 | Takatsu et al. |
| 2018/0241259 | A1 | 8/2018 | Maekawa et al. |
| 2019/0068007 | A1 | 2/2019 | Takatsu et al. |

FOREIGN PATENT DOCUMENTS

| | | |
|---|---|---|
| JP | 10-223057 | 8/1998 |
| JP | 2005-102101 | 4/2005 |
| JP | 2007-247218 | 9/2007 |
| JP | 2013-215049 | 10/2013 |
| JP | 2014-222975 | 11/2014 |
| JP | 2015-015901 | 1/2015 |
| JP | 2015-023669 | 2/2015 |
| WO | 2014/073207 | 5/2014 |
| WO | 2016/098151 | 6/2016 |

OTHER PUBLICATIONS

International Search Report issued in International Pat. Appl. No. PCT/JP2017/031865, dated Nov. 7, 2017.

ELECTRIC POWER TRANSMISSION DEVICE

TECHNICAL FIELD

The present disclosure relates to an electric power transmission device which wirelessly transmits electric power in water.

BACKGROUND ART

It has been known that an underwater base station as an electric power transmission device transmits electric power to an underwater vehicle as an electric power reception device in a contactless manner using a magnetic resonance method (see, for example, Patent Literature 1). The electric power transmission device includes a resonance coil for electric power transmission, a balloon, and a balloon control mechanism. The resonance coil for electric power transmission transmits electric power to a resonance coil for electric power reception of the electric power reception device in a contactless manner by the magnetic field resonance method. The balloon includes an electric power transmission resonance coil. The balloon control mechanism expands the balloon during electric power transmission, thereby discharging water between the resonance coil for electric power transmission and the resonance coil for electric power reception.

Further, there is known an antenna device which transmits electric power and data to an IC-mounted medium by an electromagnetic induction method using a 13.56 MHz frequency band (see, for example, Patent Literature 2). The antenna device includes at least one feed loop antenna fed by a signal current and at least one parasitic loop antenna not fed by the signal current, a point is disclosed in which the signal current is also generated in the parasitic loop antenna by using a magnetic field generated by the feed loop antenna, thereby expanding a communication range of the feed loop antenna.

In order to transmit electric power by the magnetic resonance method without the electric power transmission device and the electric power reception device approaching in water, it is necessary to install at least one coil at a predetermined position in water. In this case, when a frequency used for electric power transmission by the magnetic resonance method is relatively low, it is necessary to increase the diameter of the coil. When the diameter of the coil is large, the coil is heavy, and the coil tends to sink towards the water bottom.

Further, in order to install the coil in water, a support column or rope for fixing the coil to a desired position is required, but it is necessary to increase the strength of the support column or rope when the specific gravity of the coil is larger than the specific gravity of water or seawater. Thus, the construction cost for coil installation and the material cost of the coil are increased. In addition, when the coil is heavy, it is necessary to increase the size of the vessel for transporting the coil, and the transportation cost for transporting the coil is also increased.

An object of the present disclosure is to reduce various costs related to the installation of the coil for electric power transmission in water.

CITATION LIST

Patent Literature

Patent Literature 1: JP-A-2015-015901
Patent Literature 2: JP-A-2005-102101

SUMMARY OF INVENTION

An electric power transmission device according to the present disclosure transmits electric power to an electric power reception device including an electric power reception coil in water. The electric power transmission device includes one or more transmission coils including an electric power transmission coil which transmits electric power to the electric power reception coil via a magnetic field, an electric power transmission unit which transmits AC power to the electric power transmission coil, a capacitor which is connected to the transmission coil and forms a resonant circuit resonating with a transmission coil, and a buoyant body connected to at least one of the transmission coils.

According to the present disclosure, various costs related to installation of the coil for electric power transmission in water can be reduced.

DESCRIPTION OF EMBODIMENTS

Hereinafter, embodiments will be described in detail with reference to the drawings. However, unnecessarily detailed description may be omitted. For example, detailed description of a well-known matter or repeated description of substantially the same configuration may be omitted. This is to avoid unnecessary redundancy in the following description and to facilitate understanding of those skilled in the art. It is to be understood that the accompanying drawings and the following description are provided to enable those skilled in the art to fully understand the present disclosure, and are not intended to limit the claimed subject matter.

First Embodiment

Figure 1:
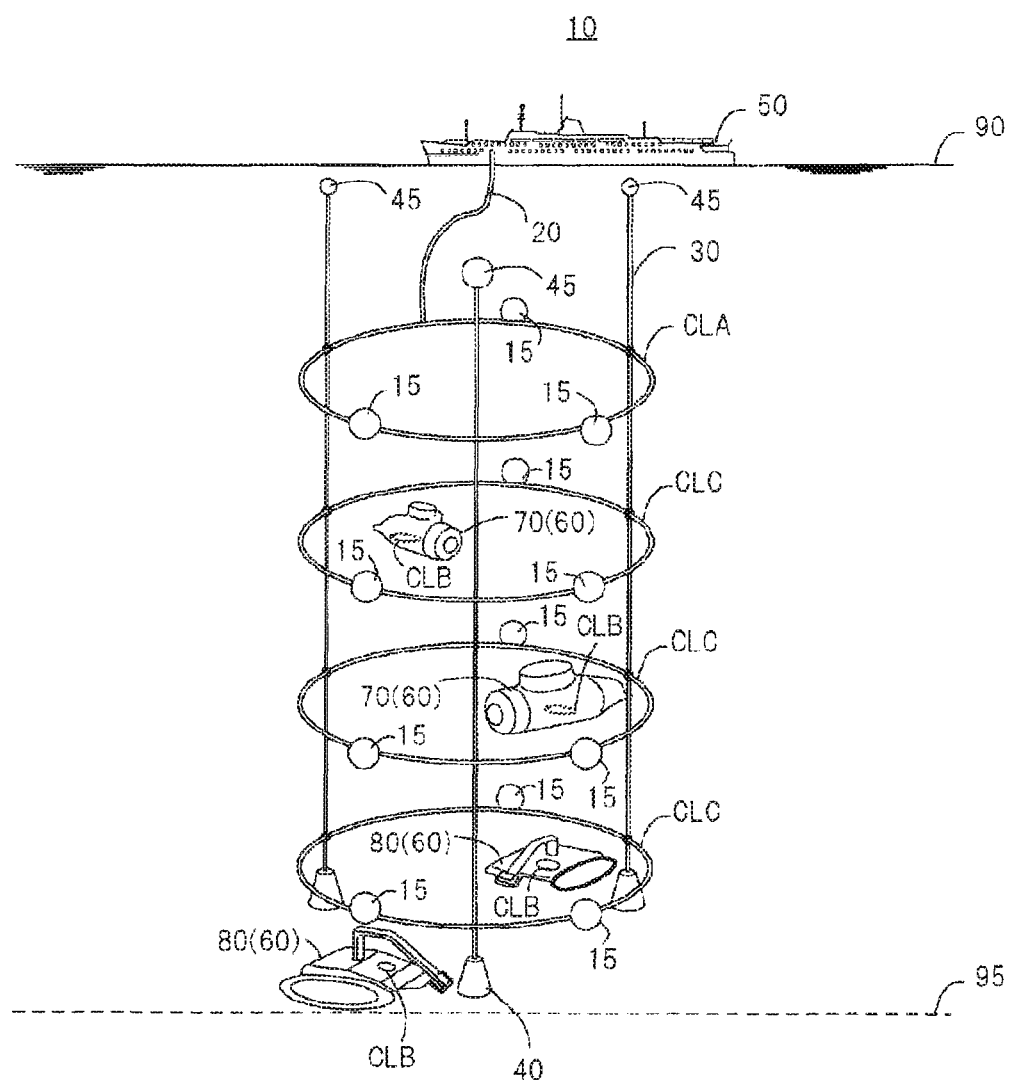
FIG. 1 is a schematic diagram illustrating an example of an environment in which an electric power transmission system in a first embodiment is placed.

FIG. 1 is a schematic diagram illustrating an example of an environment in which an electric power transmission system 10 in a first embodiment is placed. The electric power transmission system 10 includes an electric power transmission device 100, an electric power reception device 200, and a coil CL (see FIG. 2). The electric power transmission device 100 wirelessly transmits electric power to the electric power reception device 200 via a plurality of coils CLs according to a magnetic resonance method. The number of the coils CLs disposed is n and is arbitrary.

The coil CL is, for example, formed in an annular shape, covered with a resin cover, and insulated. The coil CL is, for example, a helical coil or a spiral coil. The coil CL is, for example, a cabtyre cable. The coil CL includes an electric power transmission coil CLA and an electric power reception coil CLB. The electric power transmission coil CLA is a primary coil, the electric power reception coil CLB is a secondary coil.

The coil CL may include one or more booster coils CLCs disposed between the electric power transmission coil CLA and the electric power reception coil CLB. The booster coils CLCs are disposed substantially in parallel, half or more of the opening surface formed by the booster coils CLCs overlap. The interval between the plurality of booster coils CLCs is ensured, for example, by the radius of the booster coil CLC.

The electric power transmission coil CLA is provided in the electric power transmission device 100. The electric power reception coil CLB is provided in the electric power reception device 200. The booster coils CLCs may be provided in the electric power transmission device 100 or in the electric power reception device 200, or may be provided in the electric power transmission device 100 and the electric power reception device 200 respectively. A part of the booster coils CLCs may be provided in electric the power transmission device 100, and other parts thereof may be provided in the electric power reception device 200.

The electric power transmission coil CLA and the booster coils CLCs have diameters, for example, of about 10 m. The electric power reception coil CLB has a diameter of, for example, about 1 m. The wire diameter of the coil CL is, for example, about 0.01 m to 0.04 m. The number of turns (coil turns) of the coil CL is arbitrary, and is, for example, 1 or 5.

The electric power transmission device 100 is installed in a marine vessel 50. The electric power reception device 200 is installed in a movable underwater vehicle 60 (for example, a submersible 70 or a water bottom excavator 80) or an electric power reception device (for example, a seismometer, a monitoring camera, a geothermal generator) fixedly installed. Each coil CL is disposed in water (for example, in the sea).

The submersible 70 may include, for example, a remotely operated vehicle (ROV), an unmanned underwater vehicle (UUV), or an autonomous underwater vehicle (AUV).

A part of the marine vessel 50 is above a water surface 90 (for example, the sea surface), that is, on the water, other parts of the marine vessel 50 is below the water surface 90, that is, in water. The marine vessel 50 is movable on the water, for example, is freely movable on the water at a data acquisition location. The electric power transmission device 100) of the marine vessel 50 and the electric power transmission coil CLA are connected by an electric wire 20. The electric wire 20 is connected to, for example, a driver 151 (see FIG. 2) in the electric power transmission device 100 via a water connector.

The underwater vehicle 60 is in water or the water bottom 95 (for example, the seafloor), and runs in water or the water bottom 95. For example, the underwater vehicle 60 can move freely to the data acquisition point by an instruction from the marine vessel 50. The instruction from the marine vessel 50 may be transmitted by communication via each coil CL, or may be transmitted by other communication methods.

The coils CL are connected to connectors 30 and, for example, are disposed at equal intervals. The distance between adjacent coils CL (coil interval) is, for example, 5 m. The coil interval is, for example, about half the diameter of the coil CL. The electric power transmission frequency is, for example, 40 kHz or less, preferably less than 10 kHz, in consideration of attenuation of magnetic field strength in water or in the sea. In addition, when electric power is transmitted at a transmission frequency of 10 kHz or more, it is necessary to perform a predetermined simulation based on the regulations of the Radio Act, and in the case of less than 10 kHz, the operation can be omitted. The lower the electric power transmission frequency, the longer the electric power transmission distance, the larger the coil CL, and the longer the coil interval.

The inductance of the coil CL is determined based on the electric power transmission frequency, and the diameter and the number of turns of the coil CL are determined. The diameter of the coil CL is, for example, several meters to several hundred meters. As the thickness of the coil CL is larger, the electric resistance in the coil CL decreases, and the electric power loss decreases. The electric power transmitted via the coil CL is, for example, 50 W or more, and may be the kW order.

In the present embodiment, as an example, the transmission frequency is 3 kHz or less. The transmission electric power is 100 W. The transmission efficiency, that is, the ratio of the electric power transmitted by the electric power transmission coil CLA and electric power received by the electric power reception coil CLB is 30% or more. The electric power transmission distance by the coil CL is 10 m or more.

Although the number of the connectors 30 is three in FIG. 1, the present invention is not limited thereto. A sinker 40 is connected to the end of the connector 30 on the side of the electric power reception coil CLB. A buoy 45 is connected to the end of the connector 30 on the side of the electric power transmission coil CLA.

Movement of the connector 30 can be restricted by the sinker 40, and the movement of each coil CL fixed to the connector 30 can be restricted. Therefore, even when a water flow occurs in water, the movement of each coil CL is restricted by the sinker 40, so that decrease in the efficiency of electric power transmission using the coil CL can be suppressed.

In addition, since the sinker 40 is connected to the end of the connector 30 on the side of the electric power reception coil CLB and the buoy 45 is connected to the end of the connector 30 on the side of the electric power transmission coil CLA, the sinker 40 is on the water bottom side, the buoy 45 is on the water surface side, and the connector 30 can be maintained in a posture substantially perpendicular to the water surface. Therefore, the surface defined by each coil CL is substantially parallel to the water surface, and electric power can be transmitted in the water depth direction (direction substantially orthogonal to the water surface) by the magnetic field resonance method.

The sinker 40 is removed from the connector 30 when the connector 30 is transported, and the sinker 40 may be attached to the connector 30 when the connector 30 has been transported and is disposed at a predetermined position. Accordingly, the connector 30 is easily transported.

Further, buoyant bodies 15 may be connected to the coil CL. The coil CL includes the electric power transmission coil CLA, the electric power reception coil CLB, and one or more booster coils CLCs, and the buoyant bodies 15 are connected to one or more coils CLs. The buoyancy of the coil CL to which the buoyant bodies 15 are connected is obtained by the buoyant bodies 15. It is preferable that the coil CL has neutral buoyancy in water due to the buoyancy obtained by the buoyant bodies 15.

Further, it is preferable that a system structure including a plurality of coils CLs and connectors 30 as a whole obtains neutral buoyancy in water by the buoyant bodies 15. By obtaining neutral buoyancy, for example, the system structure can be easily transported in water. The system structure includes an underwater facility (for example, the coil CL, the connector 30) used for electric power transmission. Details of the buoyant bodies 15 will be described later.

Figure 2:
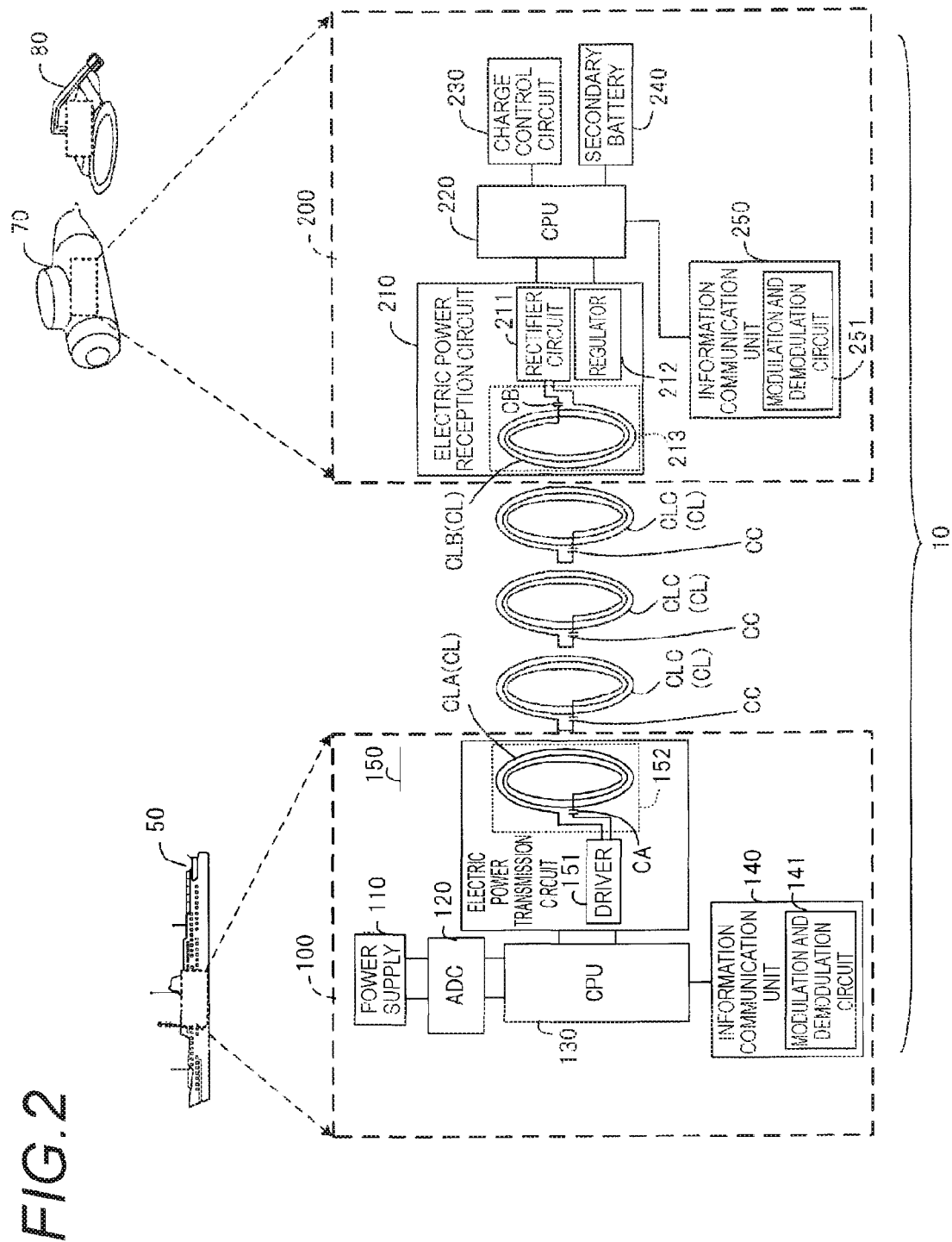
FIG. 2 is a block diagram showing a configuration example of the electric power transmission system.

FIG. 2 is a block diagram showing a configuration example of the electric power transmission system 10. The electric power transmission system 10 includes the electric power transmission device 100 and the electric power reception device 200.

The electric power transmission device 100 includes a power supply 110, an AC/DC converter (ADC) 120, a Central processing unit (CPU) 130, an information communication unit 140, and an electric power transmission circuit 150.

The ADC 120 converts the AC power supplied from the power supply 110 into DC power. The converted DC power is sent to the electric power transmission circuit 150.

The CPU 130 controls the operation of each unit (for example, the power supply 110, the ADC 120, the information communication unit 140, and the electric power transmission circuit 150) of the electric power transmission device 100.

The information communication unit 140 includes a modulation and demodulation circuit 141 for modulating or demodulating communication data communicated with the electric power reception device 200. The information communication unit 140 transmits, for example, control information from the electric power transmission device 100 to the electric power reception device 200 via the coil CL. The information communication unit 140 receives, for example, data from the electric power reception device 200 to the electric power transmission device 100 via the coil CL. The data includes, for example, data of exploration results obtained by underwater exploration or water bottom exploration by the electric power reception device 200. The information communication unit 140 enables the underwater vehicle 60 to quickly perform data communication with the underwater vehicle 60 while operating such as data collection.

The electric power transmission circuit 150 includes a driver 151 and a resonant circuit 152. The driver 151 converts the DC power from the ADC 120 into an AC voltage (pulse waveform) having a predetermined frequency. The resonant circuit 152 includes a capacitor CA and an electric power transmission coil CLA, generates an AC voltage of the sinusoidal waveform from the AC voltage of the pulse waveform from the driver 151. The electric power transmission coil CLA resonates at a predetermined resonance frequency according to the AC voltage applied from the driver 151. The electric power transmission coil CLA is impedance-matched with the output impedance of the electric power transmission device 100.

The electric power reception device 200 includes an electric power reception circuit 210, a CPU 220, a charge control circuit 230, a secondary battery 240, and an information communication unit 250.

The electric power reception circuit 210 includes a rectifier circuit 211, a regulator 212, and a resonant circuit 213. The resonant circuit 213 includes a capacitor CB and an electric power reception coil CLB, and receives the AC power transmitted from the electric power transmission coil CLA. The electric power reception coil CLB is impedance-matched with the input impedance of the electric power reception device 200. The rectifier circuit 211 converts AC power induced in the electric power reception coil CLB to DC power. The regulator 212 converts the DC voltage sent from the rectifier circuit 211 to a predetermined voltage suitable for charging the secondary battery 240.

The CPU 220 controls the operation of each unit (for example, the electric power reception circuit 210, the charge control circuit 230, the secondary battery 240, and the information communication unit 250) of the power reception device 200.

The charge control circuit 230 controls charging of the secondary battery 240 according to the type of the secondary battery 240. For example, when the secondary battery 240 is a lithium ion battery, the charge control circuit 230 starts charging the secondary battery 24 by DC power from the regulator 212 at a constant voltage.

The secondary battery 240 stores the electric power transmitted from the electric power transmission device 100. The secondary battery 240 is, for example, a lithium ion battery.

The information communication unit 250 includes a modulation and demodulation circuit 251 for modulating or demodulating communication data communicated with the electric power transmission device 100. The information communication unit 250 receives, for example, control information from the electric power transmission device 100 to the electric power reception device 200 via the coil CL. The information communication unit 250 transmits, for example, data from the electric power reception device 200 to the electric power transmission device 100 via the coil CL. The data includes, for example, data of exploration results obtained by underwater exploration or water bottom exploration by the electric power reception device 200. The information communication unit 250 enables the underwater vehicle 60 to quickly perform data communication with the marine vessel 50 while operating such as data collection.

The booster coil CLC forms a resonant circuit together with a capacitor CC, similarly to the electric power transmission coil CLA and the electric power reception coil CLB. That is, in the present embodiment, since the resonant circuit is disposed in multiple stages in water, electric power is transmitted by the magnetic resonance method.

Next, electric power transmission from the electric power transmission device 100 to the electric power reception device 200 will be described.

In the resonant circuit 152, when a current flows through the electric power transmission coil CLA of the electric power transmission device 100, a magnetic field is generated around the electric power transmission coil CLA. The oscillation of the generated magnetic field is transmitted to a resonant circuit including the booster coil CLC resonating at the same frequency or a resonant circuit 13 including the electric power reception coil CLB.

In the resonant circuit including the booster coil CLC, a current is excited in the booster coil CLC due to the oscillation of the magnetic field, the current flows, and a magnetic field is generated around the booster coil CLC. The oscillation of the generated magnetic field is transmitted to a resonant circuit including another booster coil CLC resonating at the same frequency or a resonant circuit 213 including the electric power reception coil CLB.

In the resonant circuit 213, an AC current is induced in the electric power reception coil CLB by the oscillation of the magnetic field of the booster coil CLC or the electric power transmission coil CLA. The induced AC current is rectified, converted to a predetermined voltage, and charged to the secondary battery 240.

Next, the buoyant bodies 15 will be described in detail.

The buoyant bodies 15 are connected to at least one coil CL to provide buoyancy to the coil CL. Various materials and structures of the buoyant bodies 15 may be considered.

For example, the buoyant body 15 may be formed of an air balloon, a polystyrene foam, an epoxy material that does not contain air, polyethylene, polypropylene, or the like. The buoyant body 15 may be formed by containing glass beads or microballoons in an epoxy material. The buoyant body 15 may be formed by including beads in which air is enclosed. The buoyant body 15 is formed of an insulating material. The buoyant body 15 may be formed of a material other than the above material having a specific gravity close to water (specific gravity is a little small).

Compared to polyethylene and polypropylene, the epoxy material is excellent in pressure resistance. In addition, polyethylene and polypropylene are inexpensive compared to the epoxy material. The buoyancy can be adjusted by the amount of air contained in the beads or microballoons, or by the number of beads or microballoons contained in the buoyant body 15. In addition, when the beads or microballoons are made small and approximated to a truly spherical shape, the surface area of the buoyant body 15 can be reduced, and the pressure resistance can be improved. In this case, for example, the buoyant body 15 connected to the coil CL or the system structure disposed in the deep sea is desired.

The material and structure of the buoyant body 15 may be changed according to the water depth in which the coil CL to which the buoyant body 15 is connected is positioned. For example, when the water depth in which the coil CL is positioned is relatively shallow (for example, the water depth is less than 10 m), the buoyant body 15 includes an air balloon, a polystyrene foam, an epoxy material, polyethylene, polypropylene, or the like. In addition, when the water depth in which the coil CL is positioned is relatively deep (for example, the water depth is less than 10 m), the buoyant body 15 includes an air-free epoxy material, an epoxy material containing glass beads or microballoons, beads containing air, or the like.

The buoyant body 15 may be filled with oil therein. The oil has a specific gravity of about 0.8 to 1.0, which is slightly smaller than the specific gravity of water, and is suitable for making the coil CL be neutral buoyancy in water. The buoyant body 15 may be filled with a liquid other than oil which is close to the specific gravity of water.

By filling the inside of the buoyant body 15 with a liquid such as oil, the electric power transmission device 100 can suppress deformation or breakage of the buoyant body 15 due to the water pressure around the buoyant body 15, as compared with the case where the buoyant body 15 is filled with air.

In addition, various methods may be considered as an attachment method (connection method) of the buoyant body 15 to coil CL.

Figure 3:
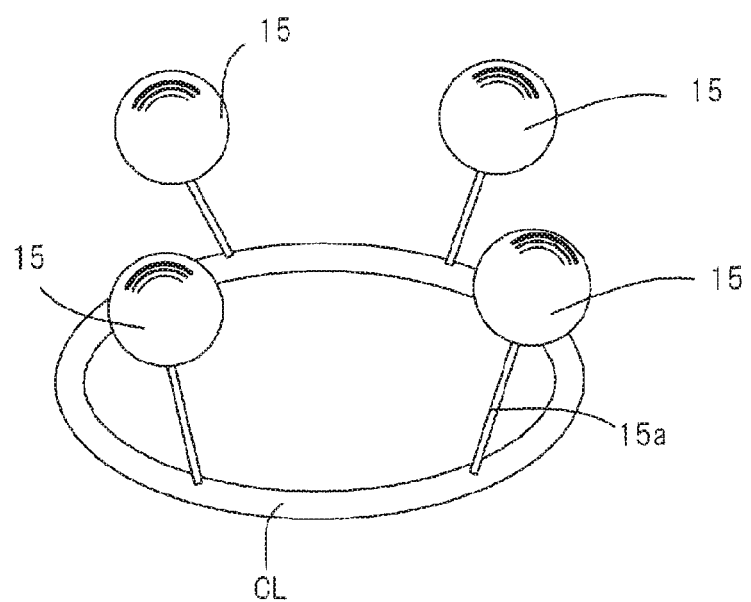
FIG. 3 is a schematic diagram showing a first attachment example of a buoyant body to a coil.
Figure 5:
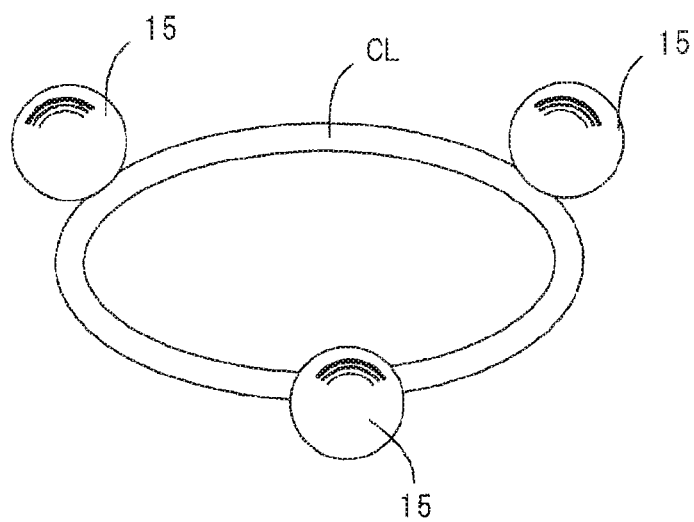
FIG. 5 is a schematic diagram showing a third attachment example of the buoyant body to the coil.
Figure 6:
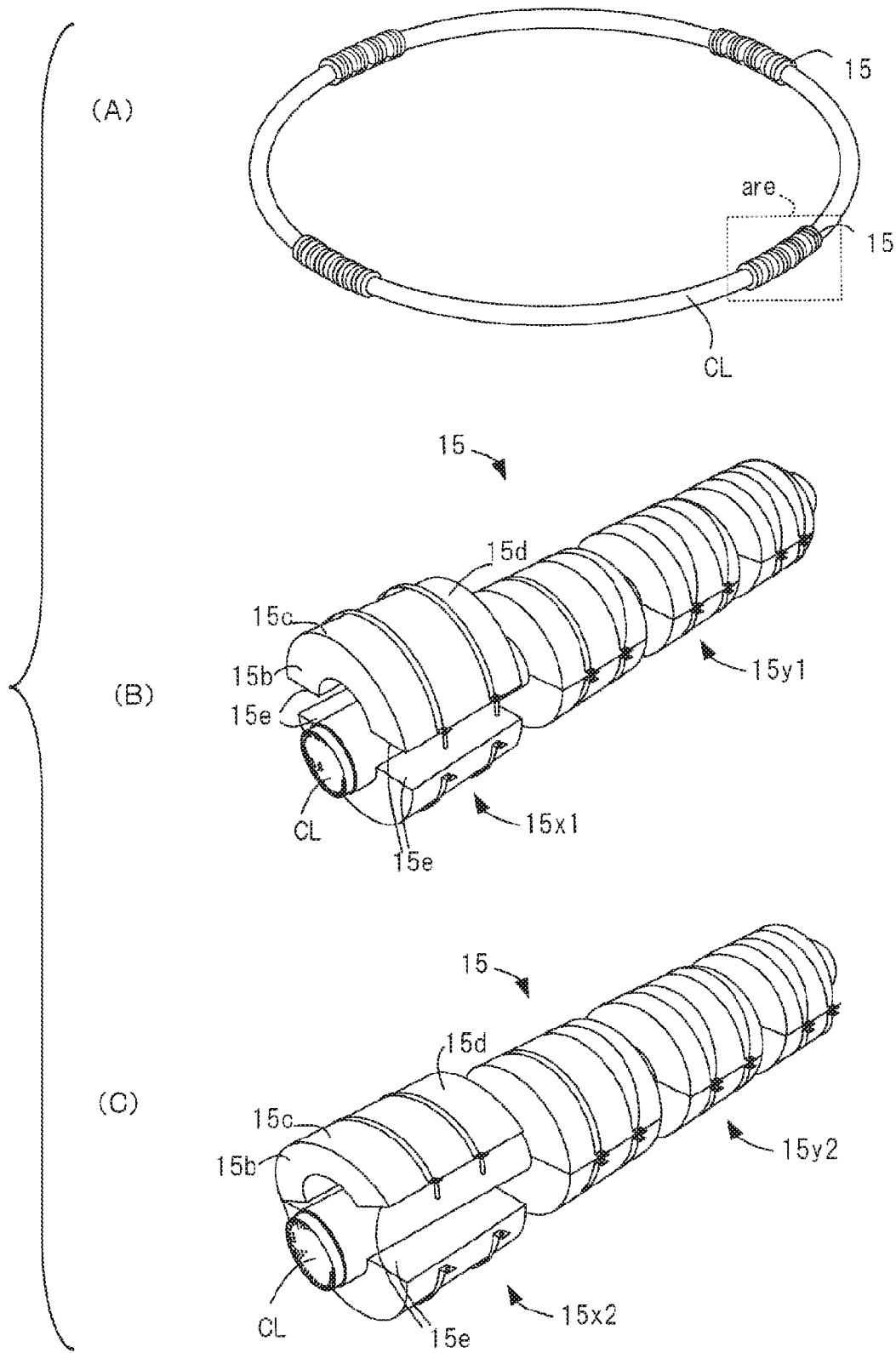
FIG. 6 is a schematic diagram showing a fourth attachment example of the buoyant body to the coil.

FIG. 3 is a schematic diagram showing a first attachment example of the buoyant body 15 to the coil CL. In, FIGS. 4 (A) and (B) are schematic diagram showing a second attachment example of the buoyant body 15 to the coil CL. FIG. 5 is a schematic diagram showing a third attachment example of the buoyant body 15 to the coil CL. In FIG. 6 (A) to (C) are schematic diagrams showing a fourth attachment example of the buoyant body 15 to the coil CL.

In the first attachment example shown in FIG. 3, a balloon method is adopted. In the balloon method, an air balloon is used as the buoyant body 15. The air balloon includes an epoxy material, polyethylene, polypropylene, or the like as an outer layer of the buoyant body 15, the inside of the outer layer is filled with air. The buoyant body 15 is connected to the coil CL via a cable 15a with or without flexibility. In the balloon system, the buoyant body 15 may be disposed in water or may be disposed on the water.

In FIG. 3, the buoyant bodies 15 are connected via the cables 15a at equal intervals in the circular coil CL. When the buoyant bodies 15 are attached at equal intervals, the buoyancy applied to the coil CL is symmetric (for example, point-symmetric) with respect to the center of the coil CL, and the coil CL can be easily made parallel to the water surface 90.

The number of the buoyant bodies 15 may be one to three or five or more. Further, the surface of the coil CL may be along a desired direction (for example, a direction substantially parallel to the water surface 90), and the buoyant bodies 15 may not be connected at equal intervals in the coil CL.

According to the first attachment example, for example, when the coil CL is disposed at a relatively shallow position, the neutral buoyancy can be easily applied to the coil CL, and the coil CL can be easily transported and installed. Further, since the operation of connecting the buoyant body 15 with the cable 15a (wire) is sufficient, the installation operation is easy.

Figure 4:
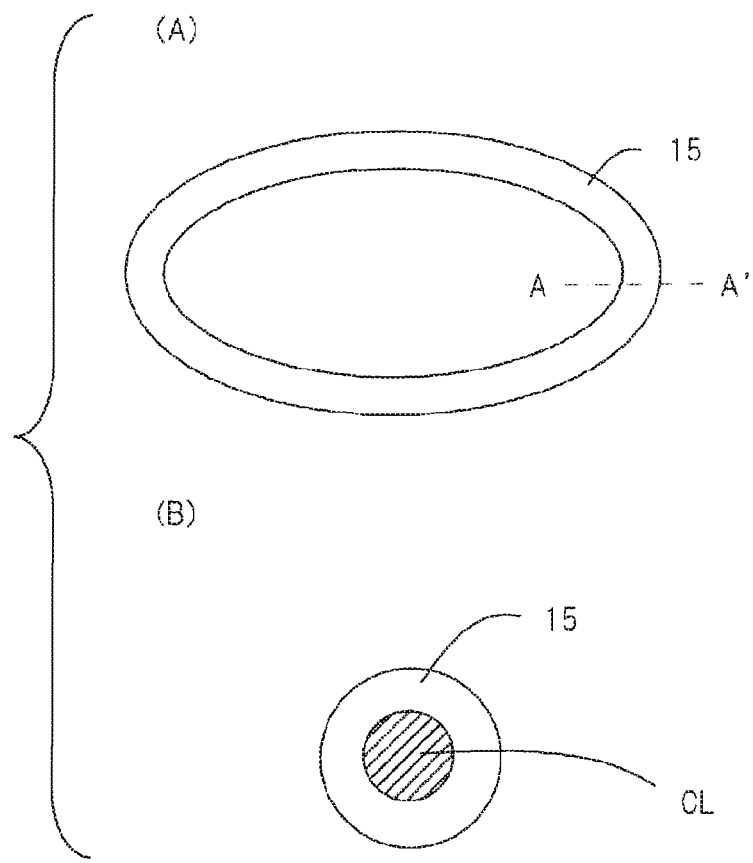
FIG. 4 is a schematic diagram showing a second attachment example of the buoyant body to the coil.

In the second attachment example shown in FIGS. 4 (A) and (B), a method of covering the entire surface of the coil CL is adopted. In the method of covering the entire surface of the coil CL, the outer periphery of the coil CL is surrounded by the buoyant body 15. That is, the buoyant body 15 is formed in an annular shape (for example, a circular shape) having the same shape as the coil CL, and is formed in a tubular shape (in a hollow shape) so as to surround the coil CL. The buoyant body 15 includes the coil CL therein. FIG. 4(A) is a schematic diagram showing the buoyant body 15 including the coil CL, and FIG. 4(B) is a cross-sectional diagram taken along line A-A' of FIG. 4(A).

According to the second attachment example, since the buoyant body 15 is uniformly continuously covered around the coil CL, the coil CL obtains uniform buoyancy at each point on the coil CL. Accordingly, the buoyancy of the coil CL is well balanced, and the coil CL can be prevented from being inclined or rotated from a desired direction. Further, a situation in which a pressure is locally applied to the buoyant body 15 and the buoyant body 15 is detached from the coil CL can be avoided.

In the third attachment example shown in FIG. 5, an attachment method to the inner periphery or the outer periphery is adopted. In the attachment method to the inner periphery or outer periphery, the buoyant body 15 is in contact with the outer periphery or the inner periphery of the coil CL. The contact portion of the outer periphery or the inner periphery of the coil CL is, for example, adhered with an adhesive, screwed by a screw, or attached by a rope, a binding band, a binding tape, or the like. In FIG. 5, three buoyant bodies 15 are attached to the outer periphery of the coil CL. The number of the buoyant bodies 15 may be one to two or four or more. In addition, in FIG. 5, the buoyant bodies 15 are attached at equal intervals on the coil CL, but the attachment intervals may not be equal to each other.

According to the third attachment example, since the operation of connecting the buoyant body 15 to the inner periphery or the outer periphery of the coil CL is sufficient, the installation operation is easy. When the buoyant body 15 is attached to the inner periphery of the coil CL, the volume of the region including the coil CL and the buoyant body 15 is reduced, and the influence of the water pressure can be reduced.

In the fourth attachment example shown in FIG. 6 (A) to (C), a sandwiching method is adopted. In the sandwiching method, the buoyant body 15 includes a part of the coil CL inside the buoyant body 15. That is, in the fourth attachment example, a part of the circular buoyant body 15 shown in the second attachment example is omitted, a part of the coil CL is exposed.

FIG. 6(A) is a schematic diagram showing the coil CL and the buoyant bodies 15 each including a part of the coil CL. FIG. 6(B) is an enlarged diagram showing a first example of a region are in FIG. 6(A). FIG. 6(C) is a diagram illustrating a second example of the region are in FIG. 6(A).

As shown in FIG. 6(B), the outer periphery of the coil CL is surrounded by a polyethylene foam material 15$b$ (for example, a chemically cross-linked polyethylene foam). The outer periphery of the polyethylene foam material 15$b$ is covered with an outer layer 15$c$. After the coil CL is covered with the polyethylene foam material 15$b$, a binding band 15$d$ is attached and bound to the outer layer 15$c$.

In FIG. 6(B), the buoyant body 15 includes two cut surfaces 15$e$ along the extension direction of the coil CL. That is, the buoyant body 15 is separated into two. The separated buoyant body 15 is sandwiched from the opposite direction (see reference numeral 15$x$1) and bound by the binding band 15$d$ (reference numeral 15$y$1). Accordingly, the buoyant body 15 is mounted to the coil CL.

Note that, in FIG. 6(B), for convenience of description, although the buoyant body 15 is separated along the extension direction of the coil CL on the front side in the drawing, the coil CL and the buoyant body 15 are disposed in water in a state in which the outer peripheral surface of the coil CL is covered with the buoyant body 15 such that the buoyant body 15 is on the back side in the drawing. Further, in FIG. 6(B), the buoyant body 15 is separated into four buoyant body parts by being separated by a plane orthogonal to the extension direction of the coil CL, but one or more buoyant body parts may be included and the number of the buoyant body parts included in the buoyant body 15 is arbitrary.

As described above, even when a part of the coil CL is included in the buoyant body 15, the coil CL can obtain buoyancy. Further, by adjusting the attachment number of the buoyant body 15, the buoyancy by the buoyant body can be easily adjusted.

In addition, by providing a plurality of cut surfaces 15$e$, attachment of the buoyant body 15 to the coil CL is easy.

In FIG. 6(C), the buoyant body 15 includes one cut surface 15$e$ along the extension direction of the coil CL. That is, although the buoyant body 15 is one, the buoyant body 15 has a notch and the buoyant body 15 is opened. The coil CL is inserted into the buoyant body 15 when the buoyant body 15 is opened (see reference numeral 15$x$2), the buoyant body 15 is closed by aligning the cut surface 15$e$ of the buoyant body 15, and the outer periphery of the buoyant body 15 is bound by the binding band 15$d$ (see reference numeral 15$y$2). Accordingly, the buoyant body 15 is mounted to the coil CL.

In FIG. 6(C), for convenience of description, although the buoyant body 15 is open along the extension direction of the coil CL on the front side in the drawing, the coil CL and the buoyant body 15 are disposed in water in a state in which the outer peripheral surface of the coil CL is covered with the buoyant body 15 such that the buoyant body 15 is on the back side in the drawing. Further, in FIG. 6(C), the buoyant body 15 is separated into four buoyant body parts by being separated by a plane orthogonal to the extension direction of the coil CL, but one or more buoyant body parts may be included and the number of the buoyant body parts included in the buoyant body 15 is arbitrary.

As described above, by setting the cut surface 15$e$ of the buoyant body 15 to one, it is difficult for water to pass through the buoyant body 15 after attachment of the buoyant body 15 to the coil CL, and water cannot easily enter the coil CL inside the buoyant body 15, so that reduction of buoyancy can be suppressed. Further, by suppressing the infiltration of water into the buoyant body 15, the corrosion of the coil CL can be reduced, and the durability of the coil CL can be improved.

Second Embodiment

Figure 7:
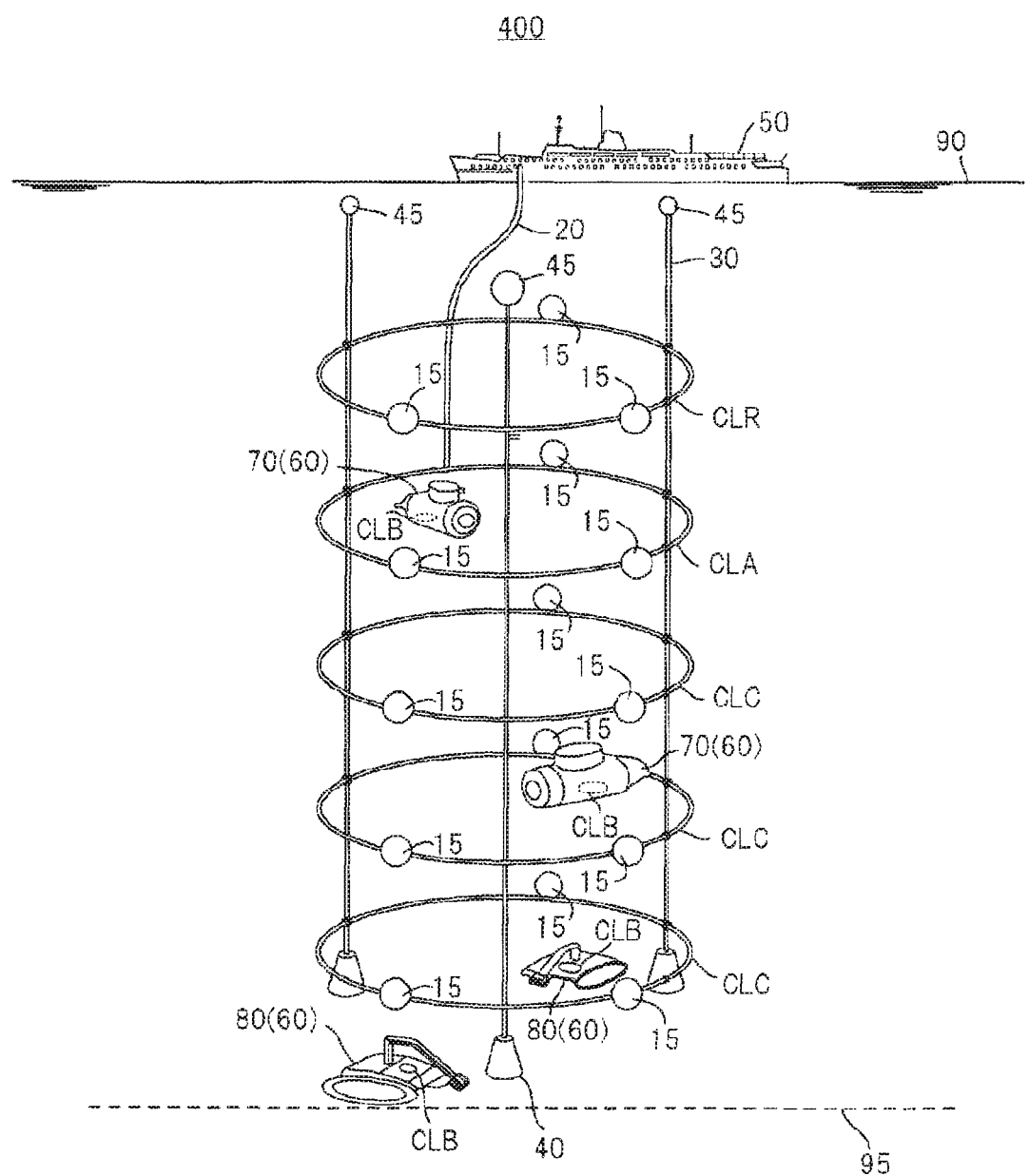
FIG. 7 is a schematic diagram illustrating an example of an environment in which the electric power transmission system in the second embodiment is placed.

FIG. 7 is a schematic diagram illustrating an example of an environment in which an electric power transmission system 400 according to a second embodiment is placed. In FIG. 7, portions common to those of the first embodiment are denoted by the same reference numerals. Also, in order to simplify the description, descriptions of portions common to those of the first embodiment will be appropriately omitted.

The electric power transmission system 400 is different from that of the first embodiment in which a reflection coil CLR is provided between the electric power transmission coil CLA and the water surface 90. The reflection coil CLR reflects the magnetic field emitted from the electric power transmission coil CLA in the direction of the water surface 90 towards the water bottom 95. Accordingly, the magnetic field emitted from the electric power transmission coil CLA can be suppressed from being emitted from the water surface 90. Therefore, it is possible to suppress interference between the magnetic field emitted from the electric power transmission coil CLA and the communication of the very long wave (VLF) band or the ultralong wave (ULF) on the water or in water.

Since the reflection coil CLR needs to avoid resonance with the electric power transmission coil CLA, no capacitor is connected like the electric power reception coil CLB and the booster coil CLC, and a resonant circuit is not formed. That is, the reflection coil CLR is a closed loop without a capacitor.

Further, the reflection coil CLR is not limited to one ring as shown in FIG. 7. For example, inside the reflection coil CLR, the second reflection coil having a smaller coil diameter than the reflection coil CLR may be disposed concentrically with the reflection coil CLR. Accordingly, since the region where the magnetic field generated from the electric power transmission coil CLA can be reflected towards the water bottom is increased, it is possible to more reliably suppress the magnetic field from being emitted from the water surface 90. Further, three or more reflection coils CLR may be provided.

Further, buoyant bodies 15 may be connected to the coil CL. The coil CL includes the electric power transmission coil CLA, the electric power reception coil CLB, one or more booster coils CLC, and the reflection coil CLR, but the buoyant bodies 15 are connected to one or more coils CL. Therefore, the buoyant bodies 15 may be connected to the reflection coil CLR.

The buoyancy of the coil CL to which the buoyant bodies 15 are connected is obtained by the buoyant bodies 15. The coil CL preferably has neutral buoyancy in water. Further, it is preferable that the plurality of coils CLs and connectors 30 have neutral buoyancy in water as a whole by the buoyant body 15. By obtaining neutral buoyancy, for example, transportation in water is easy. Details of the material, structure, and attachment method of the buoyant body 15 are the same as those of the first embodiment.

(Modification of Installation Environment of Electric Power Transmission System)

Next, a modification of the environment in which the electric power transmission systems 10, 400 of the first embodiment and the second embodiments are placed will be described. Here, the electric power transmission system 10 is illustrated as an example, but the same applies to the electric power transmission system 400.

Figure 8:
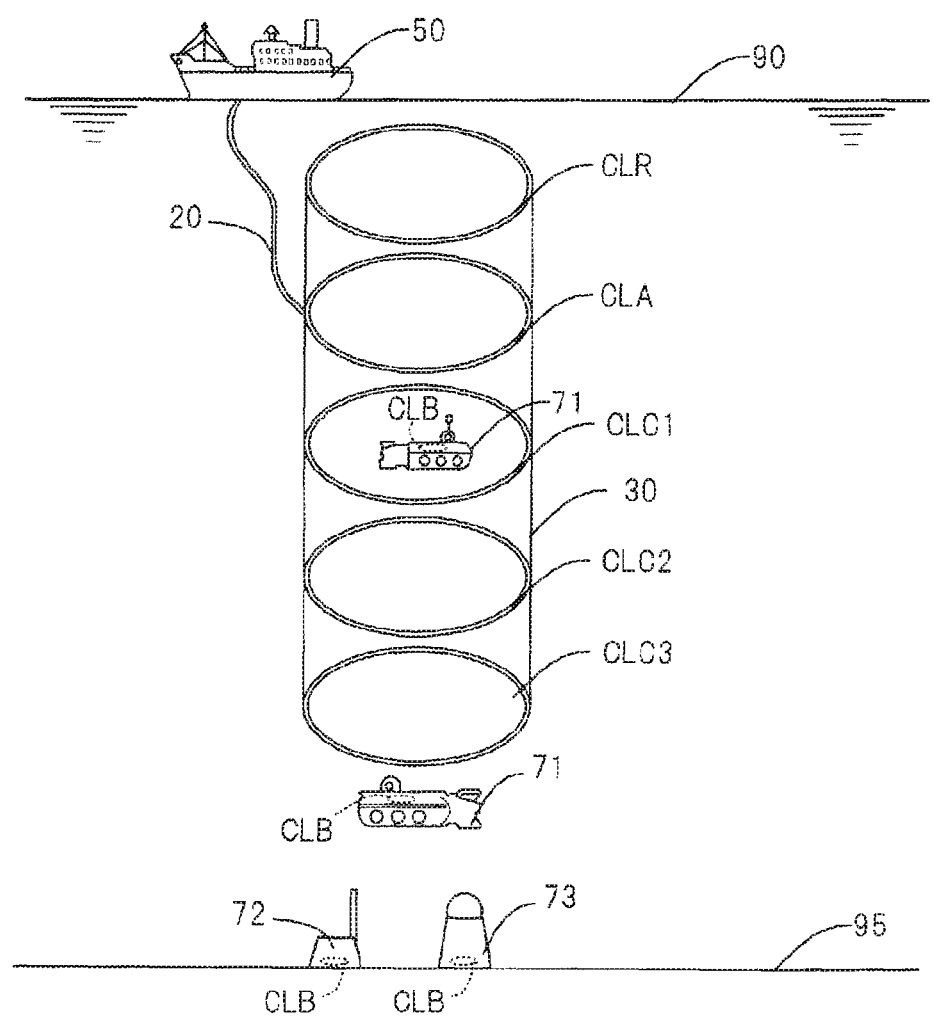
FIG. 8 is a schematic diagram illustrating a first modification of the environment in which the electric power transmission system is placed.

FIG. 8 is a schematic diagram illustrating a first modification of the environment in which the electric power transmission system 10 is placed. In FIG. 8, a plurality of coils CLs (the reflection coil CLR, the electric power transmission coil CLA, and three booster coils CLC1 to CLC3) are connected via the connector 30. UUV71a runs inside the booster coil CLC2 (in a region surrounded by the booster coil CLC1). UUV71b runs below the booster coil CLC3 (towards the water bottom). UUV71a. UUV71b include electric power reception coils CLBs. The electric power reception coil CLB is disposed, for example, substantially parallel to the water surface 90 so as to receive electric power transmission using the magnetic field.

The UUV71a receives electric power transmission through the electric power transmission coil CLA and the booster coil CLC1. The UUV71b receives electric power transmission through the electric power transmission coil CLA and the three booster coils CLC to CLC3. Accordingly, the UUV71a and UUV71b can perform data acquisition activity or the like.

A seismometer 72 and an undersea monitoring camera 73 are installed in the vicinity of the water bottom 95 below the booster coil CLC3. The seismometer 72 and the undersea monitoring camera 73 include electric power reception coils CLBs. The electric power reception coil CLB is disposed, for example, substantially parallel to the water surface 90 so as to receive electric power transmission using the magnetic field. The electric power reception coils CLBs of the seismometer 72 and the undersea monitoring camera 73 receive the electric power transmitted from the electric power transmission coil CLA by the magnetic field resonance method via one or more booster coils CLCs, as necessary.

Accordingly, the seismometer 72 can receive electric power from the marine vessel 50 in the vicinity of the water surface 90 without connecting a power supply source and the cable or the like or moving to the power supply source, and can detect the rocking of the seafloor as the water bottom 95 due to the earthquake. The undersea monitoring camera 73 can receive electric power from the marine vessel 50 in the vicinity of the water surface 90 and receive electric power from the marine vessel 50 in the vicinity of the water surface 90 without connecting the power supply source and the cable or the like, and can capture images in the vicinity of the seafloor as the water bottom 95 and monitor the vicinity of the seafloor. As described above, electric power may be transmitted using the coil CL to a device which does not move other than the underwater vehicle 60.

Figure 9:
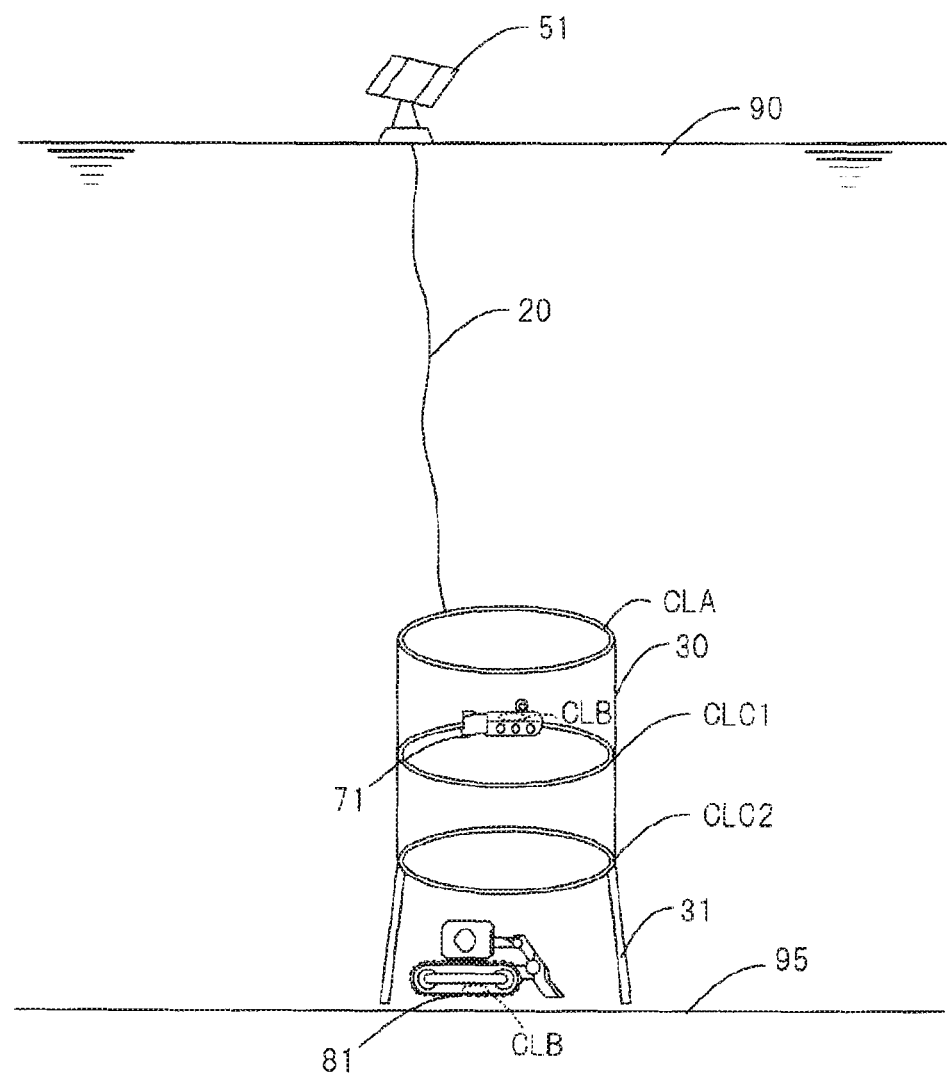
FIG. 9 is a schematic diagram illustrating a second modification of the environment in which the electric power transmission system is placed.

FIG. 9 is a schematic diagram illustrating a second modification of the environment in which the electric power transmission system 10 is placed. In FIG. 9, a plurality of coils CLs (electric power transmission coil CLA and two booster coils CLC1, CLC2) are connected via the connector 30. In addition, a solar power generator 51 is disposed on the water instead of the marine vessel 50. The solar power generator 51 is connected to the electric power transmission coil CLA via an undersea cable as the electric wire 20. The booster coil CLC2 is installed in the water bottom 95 by the support column 31. The support column 31 may not be in contact with the water bottom 95.

Below the booster coil CLC2, a self-propelled robot 81 as the water bottom excavator 80 runs the water bottom 95. The self-propelled robot 81 inspects the water or the water bottom 95, for example. The self-propelled robot 81 includes the electric power reception coil CLB. The electric power reception coil CLB is disposed, for example, substantially parallel to the water surface 90 so as to receive electric power from the solar power generator 51 by using the magnetic field.

Accordingly, the electric power transmission system 10 can supply electric power from the solar power generator 51 which does not move on the water to the self-propelled robot 81 in water or the water bottom by the magnetic field resonance method using the coil CL. Therefore, the self-propelled robot 81 does not need to receive electric power by wire, and does not need to float in the vicinity of the water surface 90 when receiving power supply. Therefore, the self-propelled robot 81 can continue operating in water or the water bottom 95 while receiving power supply.

A generator (for example, a wind power generator or a wave power generator) other than the solar power generator 51 may be disposed on the water.

The connector 30 may not be provided, and the plurality of coils CLs (the electric power transmission coil CLA and the two booster coils CLC1, CLC 2) may not be connected via the connector 30.

Figure 10:
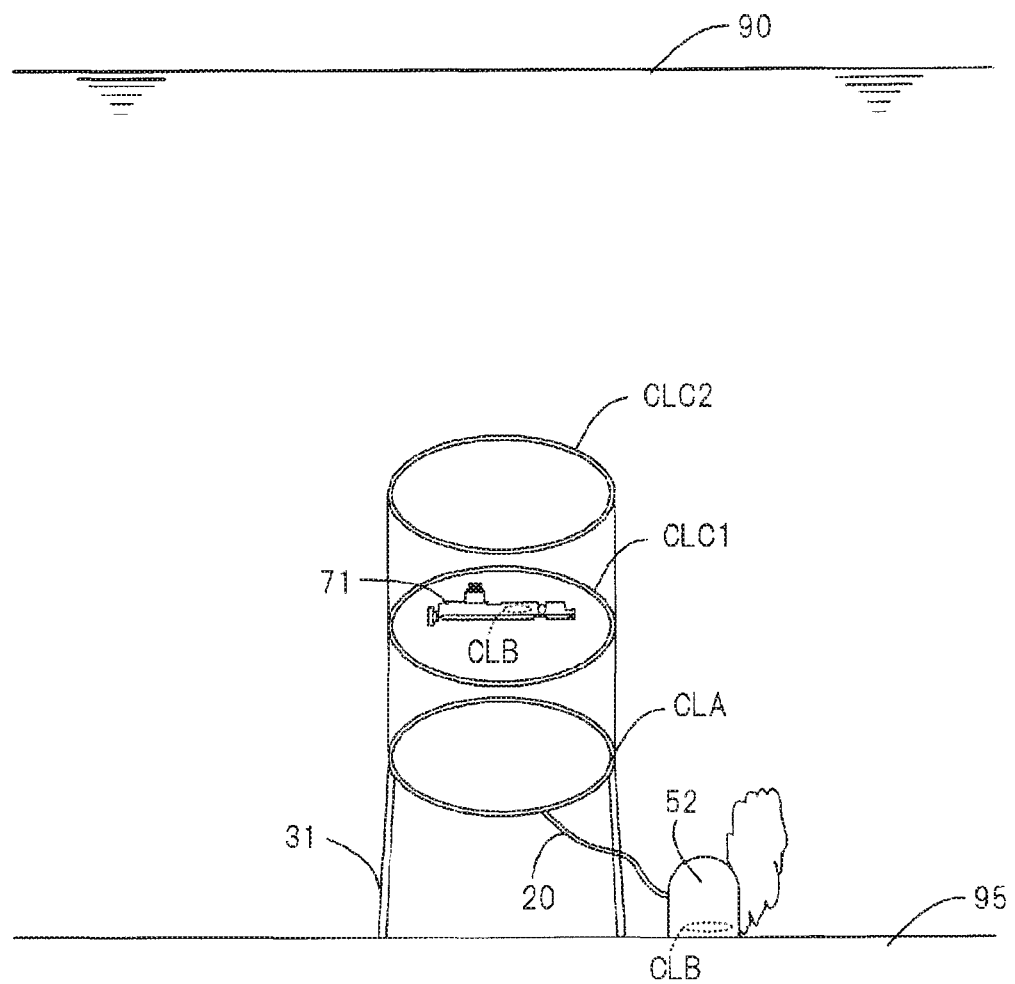
FIG. 10 is a schematic diagram illustrating a third modification of the environment in which the electric power transmission system is placed.

FIG. 10 is a schematic diagram illustrating a third modification of the environment in which the electric power transmission system 10 is placed. In FIG. 10, a plurality of coils CLs (the electric power transmission coil CLA and two booster coils CLC1, CLC 2) are connected via the connector 30. The vicinity of the water bottom 95 is a hydrothermal deposit, and a geothermal generator 52 is installed on the water bottom 95. The geothermal generator 52 is connected to the electric power transmission coil CLA via the undersea cable as the electric wire 20. In FIG. 10, the electric power transmission coil CLA is disposed closer to the water bottom 95 than other coils CLs (the booster coils CLC1, CLC 2). The electric power transmission coil CLA is installed on the water bottom 95 by the support column 31. The support column 31 may not be in contact with the water bottom 95.

UUV71 runs at the center of the booster coil CLC1. UUV71 includes the electric power reception coil CLB. The electric power reception coil CLB is disposed, for example, substantially parallel to the water surface 90 so as to receive electric power from the geothermal generator 52 by using the magnetic field.

Accordingly, the electric power transmission system 10 can supply power from the geothermal generator 52 which does not move in the water bottom 95 to the UUV 71 in water or the water bottom by the magnetic field resonance method using the coil CL. Therefore, the UUV 71 does not need to be supplied with electric power by wire, and does not need to move towards the water bottom 95 when receiving power supply. Thus, the UUV 71 can continue operating in water or the water bottom 95 while receiving power supply.

Figure 11:
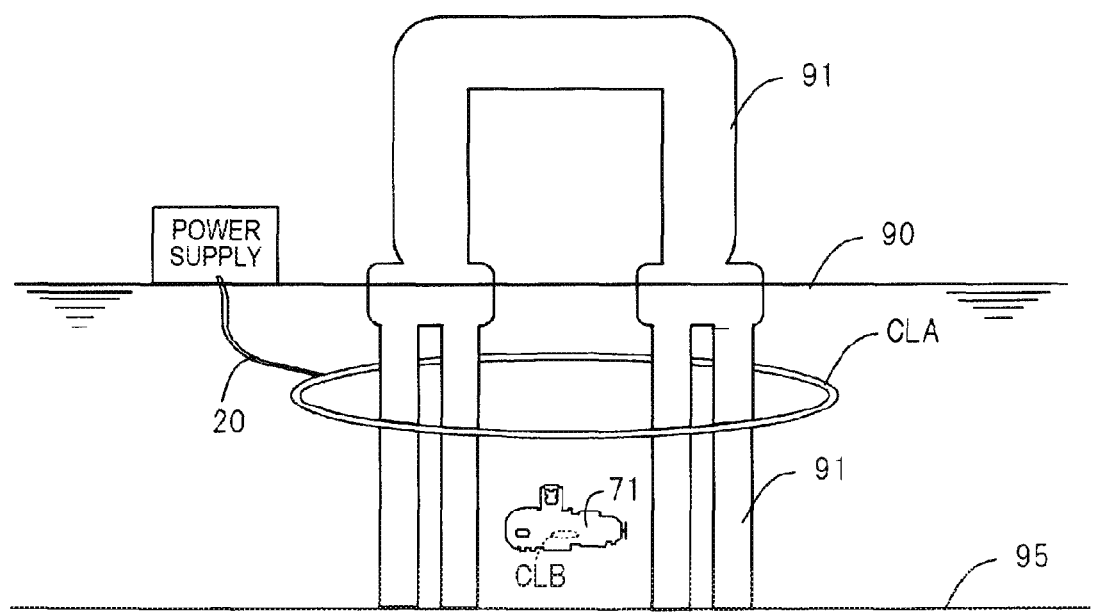
FIG. 11 is a schematic diagram illustrating a fourth modification of the environment in which the electric power transmission system is placed.

FIG. 11 is a schematic diagram illustrating a fourth modification of the environment in which the electric power transmission system 10 is placed. In FIG. 11, the electric power transmission coil CLA connected to a power supply (for example, the marine vessel 50 as a power supply source or various power generators) via a cable is disposed in water. Under the electric power transmission coil CLA (in the direction of the water bottom), the UUV 71 runs and performs underwater inspection of bridge piers 91.

The UUV 71 includes the electric power reception coil CLB. The electric power reception coil CLB is disposed, for example, substantially parallel to the water surface 90 so as to receive electric power from the geothermal generator 52 by using the magnetic field.

In FIG. 11, the electric power transmission coil CLA is installed such that the whole of a plurality of bridge piers 91 existing in water is included, but the present invention is not limited thereto. For example, the electric power transmission coil CLA may be disposed such that a part of the bridge piers 91 is included in the electric power transmission coil CLA.

Accordingly, the electric power transmission system 10 can supply power from the power supply to the UUV 71 during underwater inspection of the bridge piers 91 in the water or the water bottom by the magnetic field resonance method using the coil CL. Therefore, the UUV 71 does not need to be supplied with electric power by wire, and does not need to move towards the water bottom 95 when receiving power supply. Thus, the UUV 71 can continue inspecting the bridge piers 91 in water or in the water bottom 95 while receiving power supply.

The electric power transmission system 10 may be utilized for marine mineral resource exploration. Marine mineral resources include, for example, shale gas, manganese nodules, titanium hydride, methane hydrate, and rare earth. The electric power transmission system 10 may be used for managing and monitoring fishery resources. The electric power transmission system 10 may be utilized in an undersea observation network. Undersea observations include, for example, seismic observations, temperature observations, and $CO_2$ observations. The electric power transmission system 10 may be used for maintenance and management of the bridge piers 91 and piers.

Effects of First and Second Embodiments

When copper, for example, is used as the wire material of the coil CL, since copper has a specific gravity of about 8.9, the copper is considerably heavier than water. Further, when the connector 30 (for example, a rope) or the support column 31 is connected to the coil CL, the weight when transporting the system structure is further increased.

In this case, when the coil CL or the system structure is transported without using the buoyant body 15, there is a possibility that the coil CL or the system structure sinks to the water bottom and transportation in water is difficult. In this case, it is necessary to connect a truck to a carrier vessel, place and pull the coil CL or the system structure on the truck on the water, and move the coil CL or the system structure on the water to the installation position. In addition, even when the coil CL or the system structure can be pulled in water, sinking force towards the water bottom due to large weight of the coil CL or the system structure acts greatly, it is necessary to apply large force during transportation. In addition, the carrier vessel is increased in size in order to transport the coil CL or the system structure, the installation operation of the coil CL or the system structure is heavy. In addition, since the weight of the coil CL or the system structure is large, inertial force acts during transportation, and the carrier vessel of the coil CL or the system structure may rock wildly. In addition, there is a possibility that the cable connecting the coil CL or the system structure and the carrier vessel during transportation is broken by the large weight.

On the other hand, the electric power transmission device 100 transmit electric power to the electric power reception device 200 including the electric power reception coil. The electric power transmission device 100 includes one or more transmission coils including the electric power transmission coil CLA which transmits electric power to the electric power reception coil CLB via the magnetic field, the driver 151 which transmits AC power to the electric power transmission coil CLA, the capacitor CA which is connected to the transmission coil and forms the resonant circuit 152 resonating with the transmission coil, and the buoyant body 15 connected to at least one of the transmission coils. The driver 151 is an example of an electric power transmission unit. The transmission coil includes, for example, the electric power transmission coil.

Accordingly, by connecting the buoyant body 15 to the transmission coil, the weight of the transmission coil in water is reduced. Therefore, in the electric power transmission systems 10, 400, the transmission coil or the system structure can be transported in water, and the force applied during transportation of the transmission coil or the system structure can be reduced. The system structure may be transported at a time, or may be transported in a dispersed manner.

In addition, the specific gravity of seawater and the specific gravity of the transmission coil can be made equal to each other by giving buoyancy to the transmission coil and getting the neutral buoyancy. Therefore, the pulling force required for transporting the transmission coil or the system structure can be reduced.

In addition, by reducing the weight of the transmission coil, the strength of the connector 30 and the support column 31 with respect to the weight of the transmission coil can be reduced. Therefore, the electric power transmission systems 10, 400 can reduce costs such as material cost, transportation cost, and construction cost of the system structure.

In addition, since the weight of the transmission coil or the system structure is reduced, the carrier vessel can be downsized. In addition, since the transmission coil or the system structure has neutral buoyancy, the transmission coil or the system structure can be transported on the sea, and can be transported by a towing vessel. In addition, the inertial force during transportation of the transmission coil or the system structure is also reduced, and the rocking of the carrier vessel can also be reduced. In addition, by reducing the weight of the transmission coil or the system structure, disconnection of the cable connecting the system structure and the carrier vessel can be suppressed.

As described above, the electric power transmission device 100 and the electric power transmission systems 10, 400 can reduce various costs related to installation of the transmission coil for power transmission in water.

In addition, the electric power transmission device 100 may include the connector 30. The transmission coil may include at least one booster coil CLC which transmits electric power to the electric power reception coil CLB using the magnetic field from the electric power transmission coil CLA. The connector 30 may connect the electric power transmission coil CLA and the booster coil CLC.

Accordingly, in the electric power transmission device 100, the booster coil CLC can be made neutral buoyancy by connecting the buoyant body 15 to the booster coil CLC, and the booster coil CLC can be easily disposed in a desired position, and electric power transmission between the electric power transmission device 100 and the power reception device 200 can be suitably boosted. Further, the electric power transmission device 100 can extend the electric power transmission distance by using the booster coil CLC. In addition, similarly to the above, various costs related to the installation of the booster coil CLC can be reduced. In addition, in the electric power transmission device 100, the movement of each transmission coil can be restricted by the connector 30 and the resonance efficiency by the resonant circuit 152 can be improved, so that the electric power transmission efficiency can be improved. Therefore, even when the water flow occurs in water, the electric power transmission device 100 can suppress a decrease in the charging efficiency of the underwater vehicle 60.

The transmission coil may include the reflection coil CLR which reflects the magnetic field generated by the electric power transmission coil CLA toward the water bottom 95.

Accordingly, in the electric power transmission device 100, by connecting the buoyant body 15 to the transmission coil, the reflection coil CLR can be made neutral buoyancy, and the reflection coil CLR can be easily disposed in a desired position. In addition, the electric power transmission device 100 can suppress the magnetic field emitted from the electric power transmission coil CLA from being emitted from the water surface 90, and can suppress interference between the magnetic field emitted from the electric power transmission coil CLA and the communication of the very long wave band or ultralong wave on the water or in water. Therefore, the electric power transmission device 100 can improve the electric power transmission efficiency with the electric power reception device 200.

The buoyant body 15 may be connected to the connector 30. Accordingly, the connector 30 can be made neutral buoyancy, and the system structure including the connector 30 can be easily transported. Therefore, similarly to the above, various costs related to the installation of the system structure can be reduced.

In addition, a plurality of the buoyant bodies 15 may be connected at equal intervals in the transmission coil.

Accordingly, the electric power transmission device 100 can uniformly apply buoyancy to the transmission coil at a point symmetric position with respect to the center of the transmission coil. Therefore, after the transmission coil is installed in water, for example, the posture of the transmission coil is easily maintained along the plane parallel to the water surface 90, and the loss of the magnetic field passing through the transmission coil can be reduced.

The buoyant body 15 is connected to the transmission coil via the cable 15a, the interior may be filled with air.

Accordingly, for example, the buoyant body 15 can be easily handled by fixing the buoyant body 15 with a wire as the cable 15a with respect to the transmission coil. Further, since the air balloon is used, the buoyant body 15 can be configured at low cost. In addition, by adjusting the attachment number of the buoyant body 15, the buoyancy by the buoyant body 15 can be easily adjusted.

In addition, the buoyant body 15 may be in contact with the inner periphery or the outer periphery of the transmission coil.

Accordingly, the buoyant body 15 can be directly attached to the transmission coil, and the attachment operation of the buoyant body 15 can be facilitated. In addition, when the buoyant body 15 is in contact with the inner periphery of the transmission coil, the area of the region including the transmission coil and the buoyant body 15 can be reduced, and the influence of a tidal current or the like can be reduced.

In addition, the buoyant body 15 is formed into a tubular shape and an annular shape, a transmission coil may be included in the buoyant body 15.

Accordingly, in the electric power transmission device 100, since the buoyant body 15 includes the transmission coil, the surface area of the transmission coil and the buoyant body 15 to which force such as a tidal current is applied can be reduced. Therefore, the durability of the buoyant body 15 is improved. The transmission coil can be protected by covering the entire outer periphery of the transmission coil. Further, since the buoyant body 15 is integrally formed by including the transmission coil, the buoyant body 15 is not a projection, and the buoyant body 15 can uniformly receive the water pressure.

In addition, the buoyant body 15 may internally include a part of the transmission coil. Accordingly, buoyancy can be partially applied to the transmission coil, and for example, neutral buoyancy can be obtained. In addition, as compared with the case where the buoyant body 15 includes the entire transmission coil, the material of the buoyant body 15 can be reduced and the buoyant body 15 can be inexpensive.

The buoyant body 15 may be filled with oil therein.

Accordingly, since the oil has the same specific gravity as that of water or seawater, neutral buoyancy can be easily applied to the transmission coil. In addition, the electric power transmission device 100 can prevent the buoyant body 15 from being deformed or damaged due to water pressure by filling the buoyant body 15 with oil.

The buoyant body may be formed of different materials according to the depth in which the transmission coil is disposed.

Accordingly, different buoyancy can be applied according to the water depth, and for example, even when the transmission coils are connected in multiple stages in a water depth direction, neutral buoyancy can be easily caused in the respective transmission coils. Accordingly, the multistage transmission coils are easily disposed in desired positions along the water depth direction, and reliability of electric power transmission using multiple transmission coils is improved.

In addition, the transmission coil may transmit electric power in a direction substantially orthogonal to the water surface 90.

Accordingly, the electric power transmission device 100 can extend the electric power transmission distance in the water depth direction and can feed power to the electric power reception device 200 positioned in a deep water depth (deep sea), thereby improving the operation efficiency of the electric power reception device 200.

In addition, the transmission coil may transmit electric power and communicate data.

Accordingly, the electric power reception device 200 can charge the electric power from the electric power transmission device 100 and can perform data communication with the electric power transmission device 100 while suppressing a decrease in activity efficiency such as data collection.

In addition, according to the electric power transmission device 100 and the electric power transmission systems 10, 400, the electric power reception device 200 (for example, the underwater vehicle 60) is not required to contact the electric power transmission coil CLA even in an environment with the water flow, and it is possible to stably receive power supply by suppressing a decrease in efficiency of power transmission by the magnetic resonance method. Therefore, the underwater vehicle 60 can receive continuous power supply while performing activities such as data collection, and the operation rate of the underwater vehicle 60 when receiving power supply is improved. Therefore, the electric power transmission device 100 can improve the efficiency of data collection activity in water.

In addition, the electric power transmission device 100 can wirelessly transmit electric power according to the magnetic resonance method by using the electric power transmission coil CLA of the electric power transmission device 100 and the electric power reception coil CLB of the electric power reception device 200. In addition, since the electric power transmission device 100 is supplied with electric power without moving the underwater vehicle 60 to a predetermined power feeding position, the underwater vehicle 60 can freely move even during power feeding, and electric power transmission can be performed in a position free state. Therefore, the electric power transmission device 100 can suppress the inhibition of the activity of the underwater vehicle 60 in water or the water bottom 95. Therefore, the underwater vehicle 60 can expand the operation range even during charging and can be continuously charged during operation. In addition, since the underwater vehicle 60 can be charged at an arbitrary timing, the operation time can be shortened.

In addition, the electric power transmission device 100 can extend the electric power transmission distance by continuous electromagnetic induction by using the booster coil CLC. For example, as shown in FIG. 1, by disposing the booster coil CLC in multiple stages from the vicinity of the water surface 90 to the water bottom, the electric power transmission device 100 can transmit electric power to a deep position (for example, a water depth of 1000 m or more). In this case, the electric power transmission device 100 can wirelessly transmit electric power to the underwater vehicle 60 for mining and investigating the seafloor resources, and can suppress a decrease in the operation rate of the underwater vehicle 60 during power feeding.

In addition, the underwater vehicle 60 can be activated even when the underwater vehicle 60 does not include a large battery for operating without power supply. In this case, the underwater vehicle 60 can be reduced in size and weight.

Other Embodiments

As described above, the first and second embodiments has been described as examples of the technique of the present disclosure. However, the technique of the present disclosure is not limited to this, and may be applied to embodiments in which changes, substitutions, additions, omissions, and the like are performed.

In the first and second embodiments, a liquid such as oil is sealed in the buoyant body 15, but the liquid such as oil may be sealed in the coil CL. The coil includes an electric wire wound one or more times and a covering material covering the outer periphery of the entire wound electric wire. When oil is sealed in the coil CL, oil is sealed between the electric wire in the coil CL and the covering material.

When the liquid such as oil is sealed in the coil CL, the coil CL is hard to be deformed and is not easily damaged. Even when the buoyant body 15 is not used, a certain degree of buoyancy is applied to the coil CL, the coil CL can be easily transported.

As described above, in the transmission coil, a periphery of the electric wire formed in an annular shape is covered with the covering material, oil may be filled between the electric wire and the covering material.

Accordingly, buoyancy is applied to the transmission coil itself by the oil in the transmission coil. Therefore, when neutral buoyancy is obtained by the sum of the buoyancy of the transmission coil itself and the buoyancy by the buoyant body 15 connected to the transmission coil, buoyancy by the buoyant body 15 can be reduced, and the cost of the buoyant body 15 can be reduced.

In the first and second embodiments, the buoyant body 15 is connected to the transmission coil (for example, the electric power transmission coil CLA, the booster coil CLC, or the reflection coil CLR), but the buoyant body 15 may be connected to the electric power reception coil CLB. Accordingly, the electric power transmission system 10 can reduce the weight load of the underwater vehicle 60 (for example, AUV) on which the electric power reception coil CLB is mounted, and can suppress the electric power consumption of the underwater vehicle 60 (for example, electric power consumption of the secondary battery 240).

In the first and second embodiments, the buoyant body 15 is connected to the coil CL, but the buoyant body 15 may be connected to various cables (for example, the electric wire 20, the cable 15a) used in water. The attachment method of the buoyant body 15 to the various cables is the same as the attachment method of the buoyant body 15 to the coil CL. Accordingly, for example, similarly to the coil CL, various cables can be easily transported in water.

In the first and second embodiments, the buoyant body 15 is connected to the coil CL, but the buoyant body 15 may be connected to the connector 30 (for example, a rope) and the buoyant body 15 may be connected to the support column 31. The attachment method of the buoyant body 15 to the connector 30 or the support column 31 is the same as the attachment method of the buoyant body 15 to the coil CL.

Accordingly, for example, similarly to the coil CL, the connector 30 or the support column 31 can be easily transported in water. The buoyant body 15 connected to the connector 30 may be the buoy 45, or a buoyant body provided separately from the buoy 45.

In addition, in the first and second embodiments, the buoyant body 15 has a spherical shape in FIG. 3 and FIG. 5, but other shapes may be used. In addition, in FIGS. 4(A), (B) and FIGS. 6(A) to (C), in the cross-sectional diagram taken along the plane orthogonal to the extension direction of the coil CL, the outer peripheral shape of the buoyant body is circular, but other shapes may be used.

In the first and second embodiments, the underwater vehicle 60 includes the secondary battery 240, thereby enabling underwater charging. The underwater vehicle 60 may not include the secondary battery 240. Even in this case, the underwater vehicle 60 can receive electric power through each coil CL, that is, can be fed electric power in water.

In the first and second embodiments, the electric power transmission system 10 is exemplified by a seafloor camera system which collects data undersea or in the seafloor, but may be applied to other applications. For example, the electric power reception device 200 may be provided in an underwater robot or an unmanned exploration machine including various sensors, and may be disposed in water or water bottom 95. Accordingly, management of fishery resources and aquaculture, maintenance and management of infrastructure systems such as bridges and dams, and monitoring of seafloor of ports or the like can be performed by an underwater robot or an unmanned exploration machine.

In the first and second embodiments, the electric power transmission coil CLA, the booster coil CLC, and the electric power reception coil CLB are disposed side by side from the water surface 90 towards the water bottom 95, but the dispose direction of the coil CL is not limited thereto. For example, the electric power transmission coil CLA, the booster coil CLC, and the electric power reception coil CLB may be disposed side by side in a direction along the water surface 90 or the water bottom 95. Accordingly, the electric power transmission device 100 can transmit electric power in the horizontal direction in water.

In the first and second embodiments, the CPUs 130, 220 are illustrated as examples, but a processor other than the CPUs 130, 220 may be used. The processor may be physically configured. In addition, by using a programmable processor, since the processing content can be changed by changing the program, the degree of freedom in design of the processor can be increased. The processor may be formed of one semiconductor chip, may be physically formed of a plurality of semiconductor chips. When the processor is formed of a plurality of semiconductor chips, each control of the first embodiment may be realized by separate semiconductor chips. In this case, it can be considered that a single processor is formed of a plurality of semiconductor chips. In addition, the processor may be formed of a member (such as a capacitor) having a function different from that of the semiconductor chip. In addition, one semiconductor chip may be configured to realize the functions of the processor and the other functions.

Although the present disclosure has been described in detail with reference to specific embodiments, it will be apparent to those skilled in the art that various changes and modifications may be made without departing from the spirit and scope of the disclosure.

This application is based on Japanese Patent Application No. 2016-212218 filed on Oct. 28, 2016, the contents of which are incorporated herein by reference.

INDUSTRIAL APPLICABILITY

The present disclosure is useful for an electric power transmission device or the like which can reduce various costs related to installation of a coil for electric power transmission in water.

REFERENCE SIGNS LIST 10, 400: Electric power transmission system
15: Buoyant body
15a: Cable
15b: Polyethylene foam material
15c: Outer layer
15d: Binding band
15e: Cut surface
20: Electric wire
30: Connector
31: Support column
40: Sinker
45: Buoy
50: Marine vessel
51: Solar power generator
52: Geothermal generator
60: Underwater vehicle
70: Submersible
71: UUV
72: Seismometer
73: Undersea monitoring camera
80: Water bottom excavator
81: Self-propelled robot
90: Water surface
91: Bridge pier
95: Water bottom
100: Electric power transmission device
110: Power supply
120: ADC
130: CPU
140: Information communication unit
141: Modulation and demodulation circuit
150: Electric power transmission circuit
151: Driver
152: Resonant circuit
200: Electric power reception device
210: Electric power reception circuit
211: Rectifier circuit
212: Regulator
220: CPU
230: Charge control circuit
240: Secondary battery
250: Information communication unit
251: Modulation and demodulation circuit
CL: Coil
CLA: Electric power transmission coil
CLB: Electric power reception coil
CLC, CLC1, CLC2, CLC3: Booster coil
CLR: Reflection coil
CA, CB, CC: Capacitor

The invention claimed is:

1. An electric power transmission device which transmits electric power to an electric power reception device including an electric power reception coil in water, the electric power transmission device comprising:
   one or more transmission coils including an electric power transmission coil which transmits electric power to the electric power reception coil via a magnetic field;
   an electric power transmission unit which transmits AC power to the electric power transmission coil;
   a capacitor which is connected to the transmission coil and forms a resonant circuit which resonates with the transmission coil; and
   a buoyant body connected to at least one of the transmission coils.

2. The electric power transmission device according to claim 1, further comprising:
   a connector,
   wherein the transmission coil includes at least one booster coil which transmits electric power to the electric power reception coil by using a magnetic field from the electric power transmission coil, and
   wherein the connector connects the electric power transmission coil and the booster coil.

3. The electric power transmission device according to claim 2, wherein the buoyant body is connected to the connector.

4. The electric power transmission device according to claim 1, further comprising:

a reflection coil which reflects the magnetic field generated by the electric power transmission coil towards water bottom.

5. The electric power transmission device according to claim 1, wherein a plurality of buoyant bodies are connected at equal intervals in the transmission coil.

6. The electric power transmission device according to claim 1, wherein the buoyant body is connected to the transmission coil via a cable and is filled with air.

7. The electric power transmission device according to claim 1, wherein the buoyant body is in contact with an inner periphery or an outer periphery of the transmission coil.

8. The electric power transmission device according to claim 7, wherein the buoyant body is filled with oil.

9. The electric power transmission device according to claim 1, wherein the buoyant body includes a part of the transmission coil inside the buoyant body.

10. The electric power transmission device according to claim 1, wherein the buoyant body is formed into a tubular shape and an annular shape and includes the transmission coil inside the buoyant body.

11. The electric power transmission device according to claim 1, wherein the buoyant body is formed of a different material according to a water depth in which the transmission coil is disposed.

12. The electric power transmission device according to claim 1, wherein in the transmission coil, a periphery of an electric wire formed in an annular shape is covered with a covering material, and oil is filled between the electric wire and the covering material.

13. The electric power transmission device according to claim 1, wherein the transmission coil transmits electric power in a direction substantially orthogonal to the water surface.

14. The electric power transmission device according to claim 1, wherein the transmission coil transmits the electric power and communicates data.

* * * * *